United States Patent
Turnquist et al.

[11] Patent Number: 6,105,967
[45] Date of Patent: Aug. 22, 2000

[54] COMBINED LABYRINTH AND BRUSH SEALS FOR ROTARY MACHINES

[75] Inventors: Norman Arnold Turnquist, Cobleskill; Robert Harold Cromer, Johnstown; Ronald John Placek, Niskayuna; David Robert Skinner, Pattersonville; Christopher Edward Wolfe, Niskayuna, all of N.Y.

[73] Assignee: General Electric Co., Schenectady, N.Y.

[21] Appl. No.: 09/369,325

[22] Filed: Aug. 6, 1999

Related U.S. Application Data

[62] Division of application No. 09/018,376, Feb. 4, 1998, Pat. No. 6,045,134.

[51] Int. Cl.[7] .................................................. F16J 15/447
[52] U.S. Cl. ............................ 277/355; 277/303; 277/412
[58] Field of Search ..................................... 277/303, 347, 277/355, 412

[56] References Cited

U.S. PATENT DOCUMENTS

| | | |
|---|---|---|
| 768,593 | 8/1904 | Emmet et al. . |
| 779,785 | 1/1905 | Junggren . |
| 910,472 | 1/1909 | Junggren . |
| 957,887 | 5/1910 | Junggren . |
| 980,282 | 1/1911 | Junggren . |
| 1,352,277 | 9/1920 | Junggren . |
| 1,352,278 | 9/1920 | Junggren . |
| 1,505,647 | 8/1924 | Junggren . |
| 1,505,924 | 8/1924 | Warren . |
| 1,536,014 | 4/1925 | Junggren . |
| 1,594,838 | 8/1926 | Kégresse . |
| 1,651,855 | 12/1927 | Warren . |
| 1,670,071 | 5/1928 | Junggren . |
| 1,895,930 | 1/1933 | Junggren . |
| 2,177,927 | 10/1939 | Hodge . |
| 2,336,323 | 12/1943 | Warren . |
| 2,600,991 | 6/1952 | Hargrove . |
| 2,709,338 | 5/1955 | Morley et al. . |
| 3,186,168 | 6/1965 | Ormerod et al. . |
| 3,236,341 | 2/1966 | Chopinet et al. . |
| 3,463,498 | 8/1969 | Bill . |
| 3,759,038 | 9/1973 | Scalzo et al. . |
| 4,195,476 | 4/1980 | Wood . |
| 4,202,554 | 5/1980 | Snell . |
| 4,358,120 | 11/1982 | Moore . |
| 4,415,309 | 11/1983 | Atterbury . |
| 4,422,288 | 12/1983 | Steber . |
| 4,541,741 | 9/1985 | Woodbridge . |

(List continued on next page.)

FOREIGN PATENT DOCUMENTS

| | | |
|---|---|---|
| 0453315 | 10/1991 | European Pat. Off. . |
| 0453315 A1 | 10/1991 | European Pat. Off. . |
| 2938-484 | 3/1981 | Germany . |
| 421302 | 5/1947 | Italy . |
| 3-209068 | 9/1991 | Japan . |
| 1598926 | 9/1981 | United Kingdom . |
| 2 191 825 | 12/1987 | United Kingdom . |
| 2 301 635 | 12/1996 | United Kingdom . |
| WO92/05378 | 4/1992 | WIPO . |

*Primary Examiner*—Anthony Knight
*Assistant Examiner*—Enoch E. Peavey
*Attorney, Agent, or Firm*—Nixon & Vanderhye

[57] ABSTRACT

A combined labyrinth/brush seal is provided in a seal between rotating and stationary components. The seal includes a plurality of arcuate sealing segments, each having one or more labyrinth teeth extending radially toward the surface of the rotating component. As original equipment or retrofit, a brush seal is provided among the labyrinth teeth in a slot formed in the sealing face of the seal segment. In one form, backing and/or forward plates for the brush seal have a tongue extending into an axially extending groove of the seal segments to prevent relative radial movement of the brush seal and seal ring segments. The end faces of the brush seal and seal ring segments may be bored and filled with weld material to prevent relative circumferential movement. Where a single radially extending slot is provided in the sealing ring segment, the brush seal may be stitch-welded to the seal ring segment along opposite sides of the brush seal.

1 Claim, 4 Drawing Sheets

U.S. PATENT DOCUMENTS

| | | |
|---|---|---|
| 4,567,730 | 2/1986 | Scott . |
| 4,580,346 | 4/1986 | Reichl . |
| 4,730,876 | 3/1988 | Werner et al. . |
| 4,756,536 | 7/1988 | Belcher . |
| 4,781,388 | 11/1988 | Wörhl . |
| 4,785,623 | 11/1988 | Reynolds . |
| 4,809,990 | 3/1989 | Merz . |
| 4,901,522 | 2/1990 | Commaret et al. . |
| 4,971,336 | 11/1990 | Ferguson . |
| 4,989,886 | 2/1991 | Rulis . |
| 5,002,288 | 3/1991 | Morrison et al. . |
| 5,026,252 | 6/1991 | Hoffelner . |
| 5,029,875 | 7/1991 | Spain et al. . |
| 5,029,876 | 7/1991 | Orlando et al. . |
| 5,066,024 | 11/1991 | Reisenger et al. ............... 277/355 |
| 5,066,025 | 11/1991 | Hanrahan . |
| 5,074,748 | 12/1991 | Hagle . |
| 5,076,590 | 12/1991 | Steinetz et al. . |
| 5,090,710 | 2/1992 | Flower . |
| 5,106,104 | 4/1992 | Atkinson et al. . |
| 5,110,033 | 5/1992 | Noone et al. . |
| 5,114,159 | 5/1992 | Baird et al. . |
| 5,135,237 | 8/1992 | Flower . |
| 5,174,582 | 12/1992 | Ferguson . |
| 5,176,389 | 1/1993 | Noone et al. . |
| 5,181,728 | 1/1993 | Stec . |
| 5,181,827 | 1/1993 | Pellow et al. . |
| 5,192,084 | 3/1993 | Norbury . |
| 5,201,530 | 4/1993 | Kelch et al. . |
| 5,316,318 | 5/1994 | Veau . |
| 5,318,309 | 6/1994 | Tseng et al. . |
| 5,335,920 | 8/1994 | Tseng et al. . |
| 5,351,971 | 10/1994 | Short . |
| 5,374,068 | 12/1994 | Jewett et al. . |
| 5,400,586 | 3/1995 | Bagepalli et al. . |
| 5,401,036 | 3/1995 | Basu . |
| 5,474,305 | 12/1995 | Flower . |
| 5,474,306 | 12/1995 | Bagepalli et al. . |
| 5,480,165 | 1/1996 | Flower . |
| 5,503,405 | 4/1996 | Jewett et al. . |
| 5,509,780 | 4/1996 | Synfelt . |
| 5,524,340 | 6/1996 | Galbraith et al. . |
| 5,568,931 | 10/1996 | Tseng et al. . |
| 5,597,167 | 1/1997 | Snyder . |
| 5,599,026 | 2/1997 | Sanders et al. . |
| 5,630,590 | 5/1997 | Bouchard et al. . |
| 5,749,584 | 5/1998 | Skinner . |

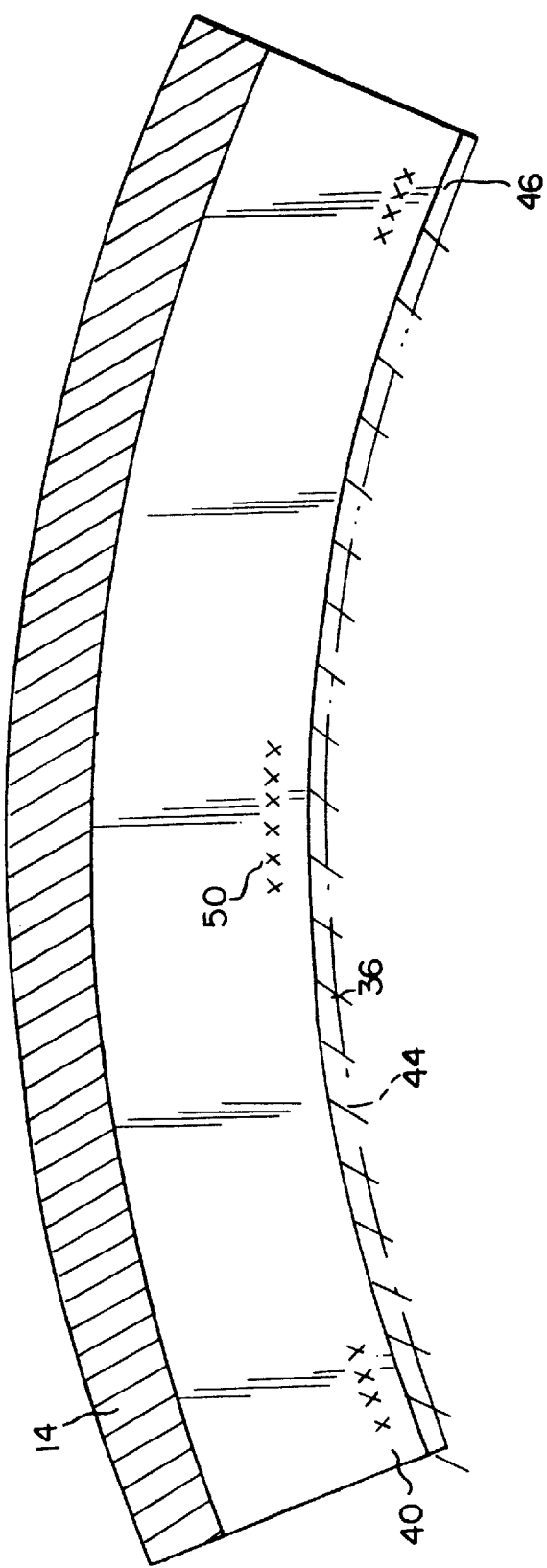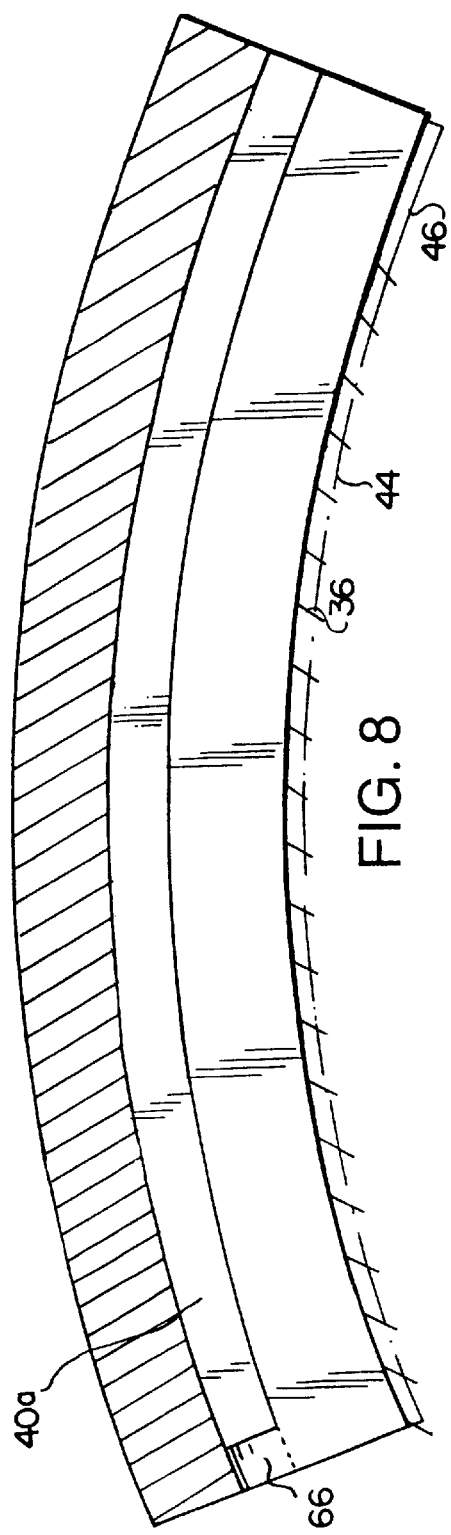

COMBINED LABYRINTH AND BRUSH SEALS FOR ROTARY MACHINES

This is a divisional of application Ser. No. 09/018,376, filed Feb. 4, 1998, now U.S. Pat. No. 6,045,134, the entire content of which is hereby incorporated by reference in this application.

TECHNICAL FIELD

The present invention relates to combination brush and labyrinth seals for rotary machines such as steam and gas turbines, as well as to methods for securing and/or retrofitting brush seals to provide labyrinth brush seal combinations.

BACKGROUND

Rotary machines such as steam and gas turbines used for power generation and mechanical drive applications are generally large machines consisting of multiple turbine stages. In turbines, high pressure fluid flowing through the turbine stages must pass through a series of stationary and rotating components and seals between the stationary and rotating components are used to control leakage. The efficiency of the turbine is directly dependent on the ability of the seals to prevent leakage, e.g., between the rotor and stator. Turbines and other machines using relatively rotating parts typically employ rigid teeth, i.e., labyrinth-type seals, to control leakage. Traditionally, rigid labyrinth seals of either a hi-lo or straight shaft design are used. These types of seals are employed at virtually all turbine locations where leakage between rotating and stationary components must be controlled. This includes interstage shaft seals, rotor end seals and blade tip seals. While labyrinth seals have proved reliable, their performance degrades over time as a result of transient events in which the stationary and rotating components interfere, rubbing the labyrinth teeth in a "mushroom" profile and opening the seal clearance. Rotary machines have also employed brush seals. Brush seals generally are less prone to leakage than labyrinth seals. A brush seal can also accommodate radial movement between fixed and rotational components, for example, between a rotor and a stator, because of the flexure of the seal bristles. Brush seals also generally conform better to surface non-uniformities. Combination brush and labyrinth-type seals are disclosed in U.S. Pat. No. 5,474,306, of common assignee herewith. However, to retrofit existing turbines as well as incorporating combined labyrinth and brush seals into new machines, physical space constraints require compact seal designs. Also, long time intervals between turbine overhauls and the high cost of maintenance make it desirable to have brush seals that are fail-safe in nature. Thus, it is desirable to design brush seals that fit within the envelope of existing labyrinth seals, as well as original equipment labyrinth-type seals.

DISCLOSURE OF THE INVENTION

In accordance with the present invention, there is provided a combined labyrinth brush seal in the environment of a rotary machine such as a turbine wherein brush seals may be applied to labyrinth teeth seal ring segments, either as original equipment or as a retrofit, and readily secured against relative circumferential and radial movement. In this invention, the brush seal may take the form of a plurality of bristles carried by a support, i.e., the bristles are arranged between a pair of backing plates in the form of arcuate segments and secured therebetween, for example, by welding at radially outermost portions of the brush seal support. Preferably, each seal ring segment has an arcuate surface from which project a plurality of axially spaced labyrinth teeth for opposition to a rotating component such as a shaft. When applying brush seals as original equipment or retrofitting the seal ring segment with a brush seal to provide a combination labyrinth brush seal, groove is formed along the arcuate surface of the seal ring segment for receiving the support for the array of bristles. That is, the arcuate plates and the bristles between the plates are concentric to the seal ring segment and are receivable in the groove such that the radial inner ends of the bristles project beyond the tips of the axially adjacent labyrinth teeth for engagement against the opposing rotary component. To secure the support to the seal ring segment, one or more welds may be provided between the support and the seal ring segment surface along each of the opposite sides of the support, thereby securing the brush seal to the seal ring segment against radial and circumferential movement relative to the seal ring segment. Preferably, one of the backing plates for the array of bristles is provided with a tapered tooth edge forming an additional labyrinth seal tooth when the brush seal is applied to the seal ring segment.

In another form of the present invention, the seal ring segment is provided with a groove having an axially extending recess radially outwardly of the seal ring segment surface. The brush seal support likewise has an axially extending leg for reception in the recess when the support is received within the groove of the seal ring segment, thereby fixing the support and seal ring segment against radial movement relative to one another. To prevent circumferential movement of the support and seal ring segment relative to one another, the end faces of the brush seal support and seal ring segment are provided with an opening extending in a generally tangential or circumferential direction, exposing adjacent end faces of the seal ring segment and support. Weld material is provided in the opening to secure the support and seal ring segment against relative circumferential movement. Thus, the brush seal and seal ring segment may be spot-welded at one end of the segment to prevent relative circumferential movement.

When retrofitting the brush seal into a seal ring segment, the sealing surface of the rotating component is preferably smoothed by machining a thin layer of material from the surface. Typically, one of the existing rotor lands is also removed, although the number of lands removed may range from 0 to more than 1, depending upon the seal axial thickness and the anticipated relative axial rotor movement.

In a preferred embodiment according to the present invention, there is provided in a rotary machine having a rotatable component and a component fixed against rotation, the components lying about a common axis, a seal between the components, comprising an elongated arcuate seal ring segment carried by the stationary component and having an arcuate surface in opposition to the rotatable component, at least one labyrinth seal tooth projecting generally radially from the seal ring segment surface toward the rotating component, the seal ring segment surface having a groove spaced axially from the seal tooth and opening radially inwardly of the segment surface, a brush seal disposed in the groove and including a plurality of bristles and a support for the bristles, the bristles being secured in the support and projecting therefrom beyond the support, the segment surface and in engagement with the rotating component and at least one weld between the support and the seal ring segment securing the support in the groove.

In a further preferred embodiment according to the present invention, there is provided in a rotary machine having a rotatable component and a component fixed against rotation, the components lying about a common axis and a labyrinth seal between the components including a plurality of generally circumferentially extending teeth carried by one of the components and projecting generally radially toward the other of the components to effect a seal therebetween, a method of forming a combination labyrinth and brush seal between the components, comprising the steps of retrofitting a circumferential array of discrete bristles on the one component axially spaced from the teeth by securing the array to the one component with the bristles lying in a plane generally normal to the axis and with the distal ends thereof projecting toward the other component beyond the radial extent of the teeth for substantial sealing engagement with the other component and welding the array of bristles to the one component.

Accordingly, it is a primary object of the present invention to provide a novel and improved apparatus and method for forming a combination labyrinth and brush seal between rotating and stationary components of a turbine wherein the brush seal is provided as a retrofit or original equipment with welds for preventing relative circumferential movement of the stationary component and the brush seal.

BRIEF DESCRIPTION OF THE DRAWINGS

FIG. 7 is a cross-sectional view thereof taken generally about on line 3—3 in FIG. 3 and illustrating the weld stitch lines for securing the brush seal in the recess of the seal segment; and FIG. 8 is a view similar to FIG. 7 illustrating the assembly of FIG. 4.

BEST MODE FOR CARRYING OUT THE INVENTION

Figure 1:
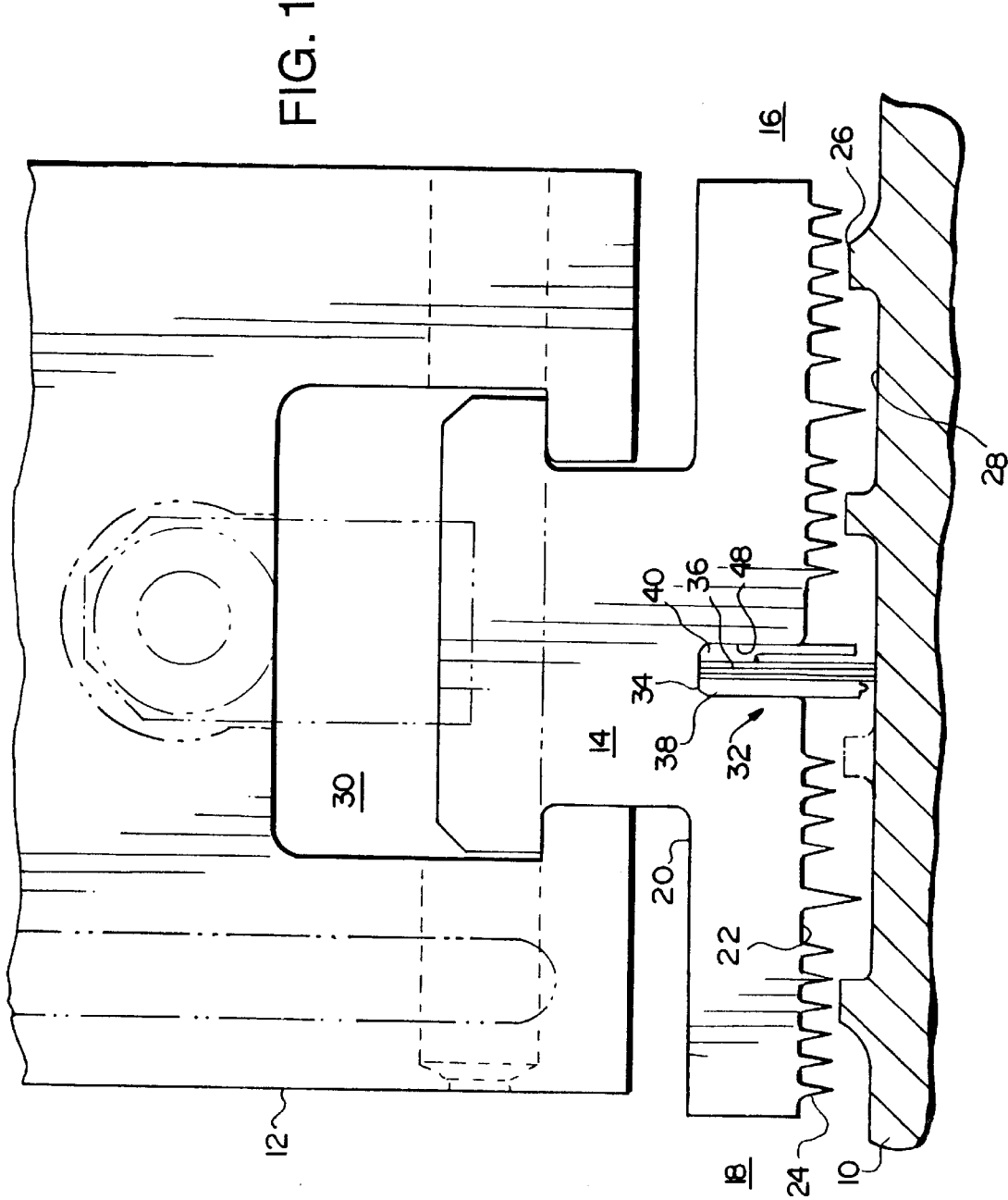
FIG. 1 is a schematic illustration of a seal ring segment between stationary and rotary components illustrating a combined labyrinth and brush seal according to the present invention on its seal surface.

Referring now to the drawings, and particularly to FIG. 1, there is illustrated a portion of a rotary machine, for example, a steam turbine, having a turbine shaft 10 disposed in a turbine housing 12 and which shaft 10 is supported conventionally within the turbine housing 12. A seal ring 14 is disposed in the turbine housing, i.e., the stationary component, separating high and low pressure regions on axially opposite sides of the ring, the high pressure region being designated 16 and the low pressure region being designated 18. The seal ring 14 is formed of an annular array of a plurality of arcuate seal ring segments 20 having sealing faces 22 and a plurality of radially projecting, axially spaced labyrinth seal teeth 24. As illustrated, the teeth are of a hi-lo design for obtaining close clearance with the radial projections or lands 26 and grooves 28 of the shaft 10. Typically, a labyrinth seal ring segment functions by placing a relatively large number of barriers, i.e., the teeth, to the flow of fluid from a high pressure region 16 to the low pressure region 18 on opposite sides of the seal, with each barrier forcing the fluid to follow a tortuous path whereby pressure drop is created. The sum of the pressure drops across the labyrinth seal is by definition the pressure difference between the high and low pressure regions on axially opposite sides thereof. Labyrinth teeth seal ring segments of this type are typically springbacked and are thus free to move radially when subjected to severe rotor-seal interference during operation. In certain designs, the springs maintain the seal ring segments 14 radially outwardly away from the rotor, for example, during start-up and shutdown, with fluid pressure being supplied between the seal ring segments and the cavity 30 in the rotor housing to displace the seal ring segments radially inwardly to obtain a smaller clearance with the rotor, i.e., close the seals after the rotor has been brought up to speed.

FIG. 1 also illustrates the seal ring segment having a combination labyrinth/brush seal. As illustrated, the seal ring segments may each be provided with a brush seal, generally designated 32. The brush seal 32 may be provided as original equipment or retrofit into existing seal ring segments. Each brush seal comprises a support 34 for a plurality of elongated bristles 36. For example, the support 34 may comprise a pair of generally arcuate support plates 38 and 40 on opposite axial sides of the bristles 36. The brush seal supports 34 are co-terminus with the seal ring segments and have end faces lying along the same radial planes as the end faces of the seal ring segments. The support plates are welded to one another along their radially outermost ends with the bristles welded to one another and to the plates at the same location.

Figure 2:
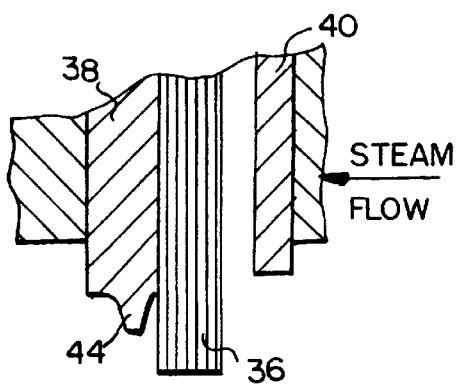
FIG. 2 is an exploded fragmentary end elevational view of a brush seal illustrating the relationship between the tips of the bristles and a backing plate having a labyrinth tooth profile.

As best illustrated in FIG. 2, the backing plate 38 located on the low pressure or downstream side of the brush seal serves as a backing for the bristles 36. Preferably, the backing plate 38 terminates in a tapered tooth profile 44 short of the distal ends of the bristles 36. Thus, while the ends of the bristles 36 are intended to bear and engage against the surface of the rotating component, i.e., shaft 10, the tooth 44 is spaced from the shaft and serves as an additional labyrinth seal tooth backing the bristles 36. The upstream or high pressure forward plate 40 is spaced from the upstream face of the bristles 36. This space enables the bristles to deflect when in engagement against the rotating surface.

In the formation of the brush seal, the bristles are normally disposed on top of an annular ring eventually serving as the backing plate for the bristles, while the forward plate is disposed on top of the bristles. The annular plates with the bristles therebetween are then welded along their radially outermost margins and the annular backing plate/bristles/ forward plate is divided into an equal number of segments as seal ring segments along radial end surfaces. It will be appreciated that the bristles are disposed between the plates at angles offset from the radius of the plates. When the annular brush seal ring is cut, it is cut along radii which removes a portion of the bristles which would otherwise extend from the end face of one bristle segment to the opposing end face of an adjacent bristle segment, leaving a triangular area in the adjacent bristle segment in which bristles do not extend, as illustrated at 46 in FIGS. 7 and 8. However, when the brush segments are secured to the seal ring segments, the profiled backing tooth 44 serves as a seal in those areas void of bristles.

Referring back to FIG. 1, the seal ring segments may be provided as original equipment or retrofitted with a groove or slot 48 for receiving the brush seal segments. While the groove 48 is illustrated generally at a central location between the axial ends of the seal ring segment, one or more grooves can be provided in the seal ring segments, depending upon the axial extent of the seal to provide one or more brush seals in combination with the labyrinth seal teeth of the seal segments and at different axial locations along the seal surface 22 than illustrated.

Figure 3:
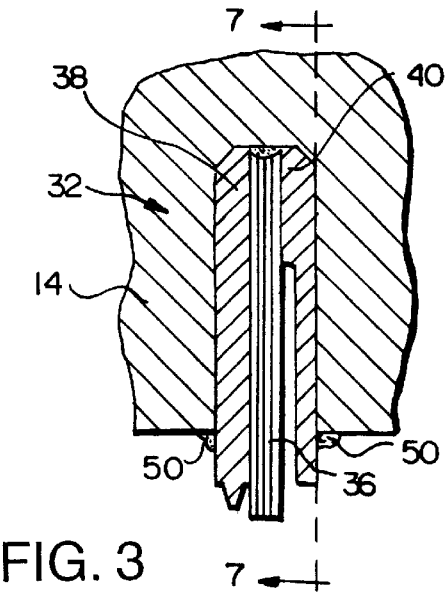
FIG. 3 is a fragmentary cross-sectional view of a brush seal inserted in a seal ring segment in a tongue-and-groove configuration.

Referring to FIGS. 1 and 3, the groove 48 formed in the seal ring segment has parallel side walls and a base forming an arcuate slot for receiving the brush segment. Note that the brush segment is disposed in groove 48 with the forward plate 40 facing in the upstream direction. To retain the brush seal in the slot, one or more welds are provided along the juncture of the brush seal segment and the surface 22 adjacent the groove 48. The welds are designated 50 in FIG. 7. That is, stitch welds may be provided along the opposite sides of the brush segment at its juncture with the surface 22 of the seal ring segment 20 to maintain the brush seal against radial and circumferential movement relative to the seal ring segment.

Figure 4:
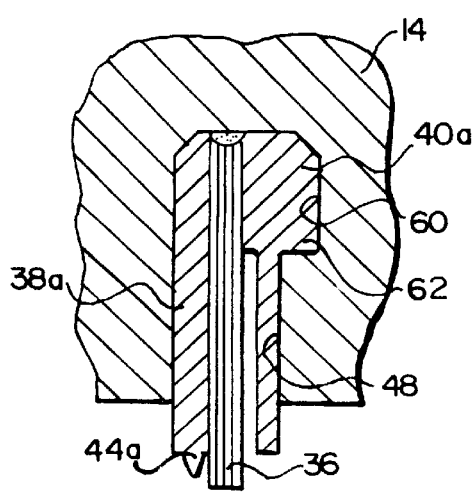
FIG. 4 is a fragmentary cross-sectional view of a brush seal in the recess of a seal ring segment according to a further form of the present invention.
Figure 5:
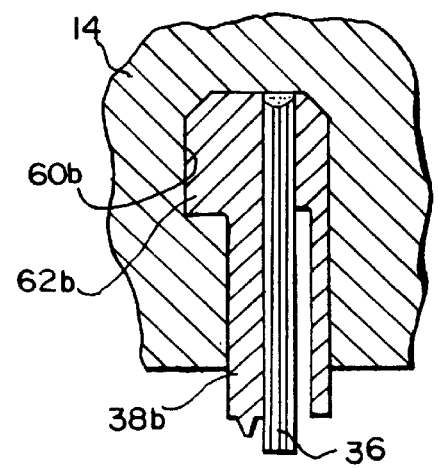
FIG. 5 is a view similar to FIG. 4 illustrating a reverse form of the brush seal in the groove.
Figure 6:
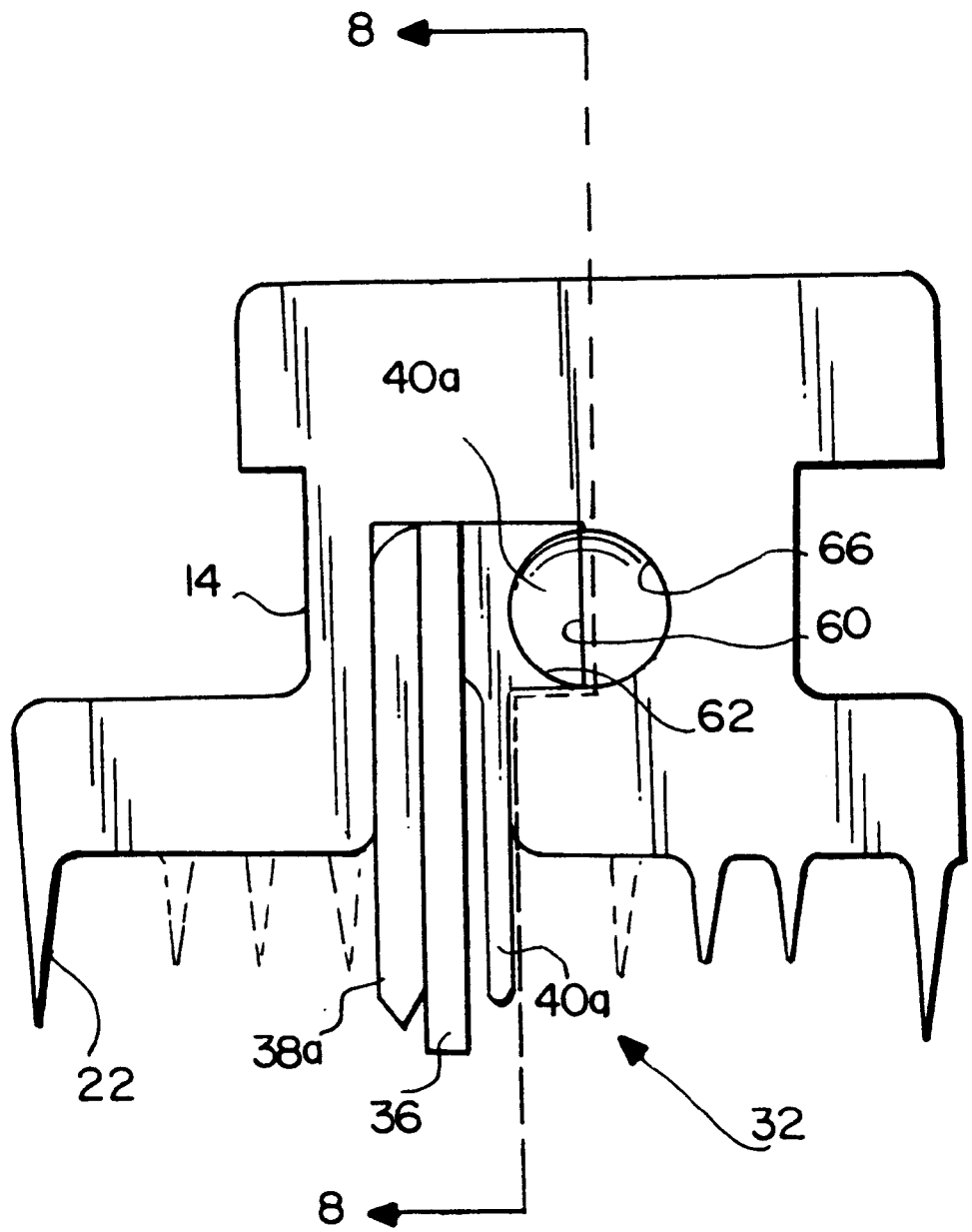
FIG. 6 is an enlarged end view of the brush seal of FIG. 4 in a seal ring segment illustrating the opening for receiving the weld material retaining the brush seal against circumferential movement.

Referring now to the embodiment hereof illustrated in FIG. 4, the groove 48 in the seal ring segment may have a recess 60 extending in an axial direction and radially outwardly of the surface 22 through which the groove 48 opens. In this form, the brush seal segment includes the bristles 36 and a backing plate 38a with the tooth profile 44a. However, the upstream plate 40a may have a projecting tongue 62 for reception in the recess 60. By sliding the brush seal segment circumferentially in the groove 48, it will be appreciated that the tongue 62 engaging in the recess 60 prevents radial movement of the brush segment relative to the seal ring segment. In FIG. 5, the groove 60b may be formed on the axially opposite side or downstream side, with the tongue 62b of the brush segment being formed on the backing plate 38b rather than on the upstream plate as illustrated in FIG. 4. In either case, the tongue-and-recess alignment of the brush seal in the seal ring segment prevents radial movement of the brush seal segment and seal ring segment.

To prevent relative circumferential movement of the brush segment and seal ring segment, the brush segment and seal ring segments are welded to one another adjacent one or both opposite end faces. To accomplish this, it will be appreciated that the end faces of the brush seal including the backing plates lie flush along radial end planes of the seal ring segments. An opening is formed in at least one end face of the seal ring segment and through one of the plates for the brush seal. Preferably, a hole 66, preferably a circular hole, is drilled in the end face of the seal ring segment and the backing plate for a limited tangential distance. By filling the hole at one or both ends of the seal ring segment with weld material, the brush segment and seal ring segment are secured to one another and prevented from relative circumferential movement.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a rotary machine having a rotatable component and a component fixed against rotation, said components lying about a common axis and a labyrinth seal between said components including a plurality of generally circumferentially extending teeth carried by one of said components and projecting generally radially toward the other of said components to effect a seal therebetween, a method of forming a combination labyrinth and brush seal between said components, comprising the steps of retrofitting a circumferential array of discrete bristles on said one component axially spaced from said teeth by securing said array to said one component with the bristles lying in a plane generally normal to said axis and with the distal ends thereof projecting toward said other component beyond the radial extent of said teeth for substantial sealing engagement with said other component, including sliding said one component and said array of bristles in a circumferential direction relative to one another and welding said array of bristles to said one component to secure said one component and said array of bristles against radial movement relative to one another and fixing said one component and said array of bristles against circumferential sliding movement relative to one another, the seal segment and array of bristles having end faces adjacent one another at one end of said segment and comprising the further steps of forming a generally tangentially extending opening in the one end of the segment exposing portions of the end faces of the array of bristles and seal segment through the one segment end and wherein the step of welding includes disposing weld material in said opening, thereby preventing circumferential movement of the brush seal and one component relative to one another.

\* \* \* \* \*